United States Patent
Koprivsek et al.

(10) Patent No.: US 12,340,962 B2
(45) Date of Patent: Jun. 24, 2025

(54) SWITCH FOR INTERRUPTION OF A DIRECT CURRENT CIRCUIT POWERED BY TWO ELECTRIC VOLTAGE SOURCES

(71) Applicant: ETI Elektroelement, d.o.o., Izlake (SI)

(72) Inventors: Mitja Koprivsek, Izlake (SI); Brane Lebar, Zagorje ob Savi (SI)

(73) Assignee: ETI ELEKTROELEMENT, D.O.O., Izlake (SI)

( * ) Notice: Subject to any disclaimer, the term of this patent is extended or adjusted under 35 U.S.C. 154(b) by 114 days.

(21) Appl. No.: 17/774,804

(22) PCT Filed: Dec. 5, 2019

(86) PCT No.: PCT/SI2019/000009
§ 371 (c)(1),
(2) Date: May 5, 2022

(87) PCT Pub. No.: WO2021/091497
PCT Pub. Date: May 14, 2021

(65) Prior Publication Data
US 2022/0392724 A1   Dec. 8, 2022

(30) Foreign Application Priority Data
Nov. 6, 2019 (SI) .................. P-201900212

(51) Int. Cl.
*H01H 39/00*   (2006.01)
(52) U.S. Cl.
CPC ................. *H01H 39/004* (2013.01)
(58) Field of Classification Search
CPC ......... H01H 39/00; H01H 39/004–006; H01H 2039/008
See application file for complete search history.

(56) References Cited

U.S. PATENT DOCUMENTS

| 2008/0137253 A1* | 6/2008 | George | ............... H01H 39/006 |
| | | | 29/428 |
| 2013/0056344 A1* | 3/2013 | Borg | ..................... H01H 39/00 |
| | | | 200/81 R |

(Continued)

FOREIGN PATENT DOCUMENTS

| EP | 2811548 A1 | 12/2014 |
| WO | 2019/027374 A1 | 2/2019 |
| WO | 2019/177546 A1 | 9/2019 |

OTHER PUBLICATIONS

International Search Report and Written Opinion dated Jul. 13, 2020 issued in PCT App. No. PCT/SI2019/000009.

*Primary Examiner* — Jacob R Crum
(74) *Attorney, Agent, or Firm* — Haynes and Boone, LLP; William B. Nash; Brooke Parker

(57) ABSTRACT

The present disclosure refers to a switch for interrupting of a circuit in which two voltage sources and at least one load are connected, wherein the switch actuate quickly in an emergency. The switch includes a main conductor connecting both electric voltage sources and said load, bridged by a supplemental conductor which is in parallel with the two voltage sources and the load, and prior to activation of the switch, interrupted and electrically open. A branch with an integrated fuse is in parallel with the main conductor and linked at two connecting points between the two electric voltage sources while the connecting points includes a movable section which under pre-determined conditions moves from contact with the main conductor into an alternate position in contact with the supplemental conductor, resulting in an open circuit across the main conductor and a closed circuit across the supplemental conductor.

2 Claims, 4 Drawing Sheets

(56) References Cited

U.S. PATENT DOCUMENTS

| | | | |
|---|---|---|---|
| 2013/0126326 A1* | 5/2013 | Borg | H01H 15/06 |
| | | | 200/547 |
| 2014/0061011 A1* | 3/2014 | Nakamura | H01H 39/006 |
| | | | 200/61.08 |
| 2019/0283626 A1 | 9/2019 | Staudenmaier | |
| 2020/0321181 A1* | 10/2020 | Mathieu | H01H 39/004 |

* cited by examiner

SWITCH FOR INTERRUPTION OF A DIRECT CURRENT CIRCUIT POWERED BY TWO ELECTRIC VOLTAGE SOURCES

CROSS-REFERENCE TO RELATED APPLICATIONS

This application is a United States national phase application of International Patent Application No. PCT/SI2019/000009 filed on 5 Dec. 2019, which claims the benefit of a Slovenia Patent Application No. P-201900212 filed 6 Nov. 2019, both of which are hereby incorporated by reference in their entirety.

BACKGROUND

The present disclosure refers to a switch, which is suitable for interruption of a DC electric circuit comprising at least a load and two directly connected electric voltage sources.

In this, the present disclosure addresses how to interrupt quickly and efficiently such an electric circuit, when needed, wherein after said interruption each potential contact between the load and anyone of said electric voltage sources would have to be eliminated, and moreover, also each potential interaction between said load and any other loads or electric circuits, which might be electrically interconnected with said load, would also have to be eliminated.

In particular in, the field of electrically powered vehicles there is a need, that instead of obtaining power by means of a single electric voltage source, a vehicle may be powered by two or more electric voltage sources. Namely, in by such approach the vehicle can still be powered although one of said electric voltage sources is out of order. However, in the field of vehicles there is also always a requirement that in emergency cases the electric circuit should be promptly interrupted, for example in the case of a crash or other damage to the vehicle, since otherwise this could lead to a short circuit and consequently generate a fire.

The present disclosure refers to a switch for interruption of a direct current circuit, wherein two DC electric voltage sources are integrated within said circuit, which are connected in series with each other and are both via a main electric conductor electrically connected with at least one electric load.

According to the present disclosure, there are between the said main electric conductor and said electric voltage sources and said load is bridged by a supplemental electric conductor, which is in parallel electrically connected with said sources and also with said load, and is prior to activation of the switch, namely during regular operation of the electric circuit, interrupted by means of a gap and is consequently electrically open. In addition, an electrically conductive branch with integrated electric fuse with a melting member may be in parallel connected to said main conductor in two connecting points in the area between both electric voltage sources. Said main conductor is in the intermediate area between said connecting points may include a movable section, which in pre-determined conditions moves apart from the main conductor and irreversibly displaces into the gap in said supplemental electric conductor, which herewith becomes electrically closed, while simultaneously the main electric conductor upon moving said section therefrom becomes electrically open.

In an embodiment of the present disclosure said section of the main conductor may be moved into the gap in the supplemental conductor by a pyro-switch, which may be activated by means of a sensor. Said sensor may be of any type suitable for activation of said pyro-switch, but in one embodiment may be an acceleration detecting sensor or accelerometer.

DETAILED DESCRIPTION

Figure 1:
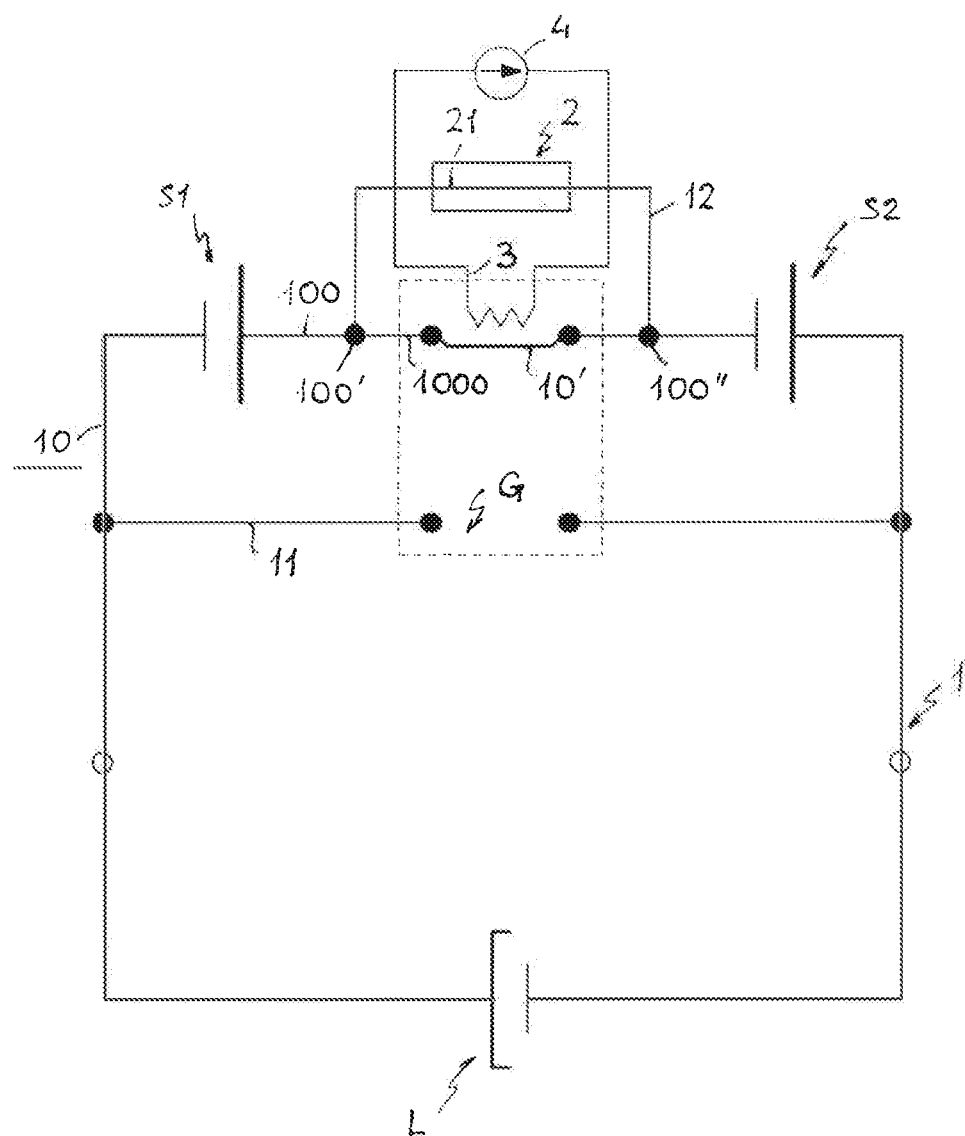
FIG. 1 is a schematically presented switch suitable for interrupting of a DC electric circuit that includes two electric voltage sources during normal operation.

An exemplary switch according to the present disclosure suitable for interruption of a direct current circuit 1 is shown in FIG. 1, wherein two electric voltage sources S1, S2 are integrated within said circuit 1, which are in serial connected with each other and are both via a main electric conductor 10 electrically connected with at least one electric load L.

Said main electric conductor 10 is in the area between said electric voltage sources S1, S2 and said load L bridged by a supplemental electric conductor 11, which is in parallel electrically connected with said sources S1, S2 and also with said load L, and is prior to activation of the switch, namely during regular operation of the electric circuit 1, interrupted by means of a gap G and is consequently electrically open.

An electrically conductive branch 12 with integrated electric fuse 2 with a melting member 21 is in parallel connected to said main conductor 10 at connecting points 100', 100" in the area 100 between both electric voltage sources S1, S2.

Figure 2:
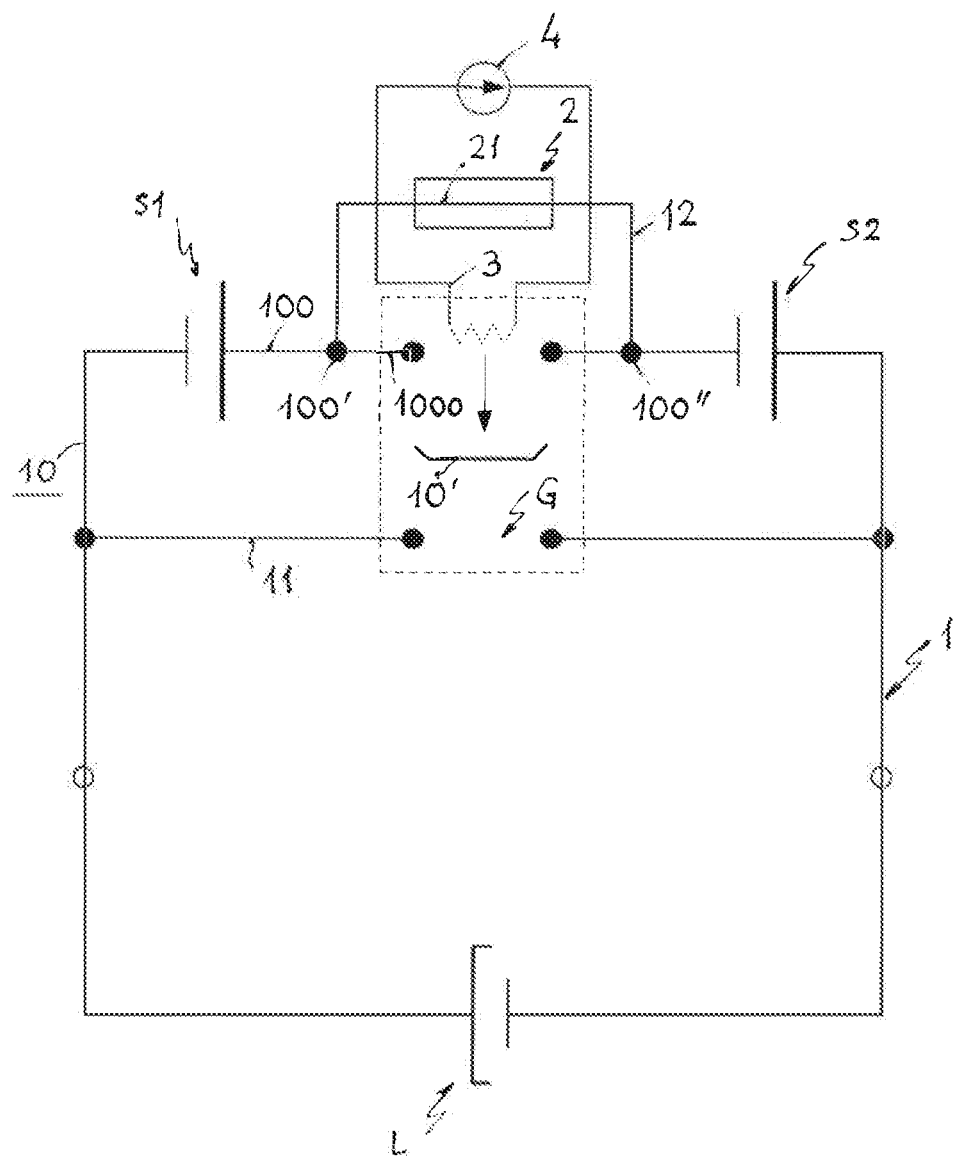
FIG. 2 is a switch according to FIG. 1, presented in a moment of time when a pyro-switch is activated on the basis of signal received from a sensor, and the electric circuit is interrupted.
Figure 3:
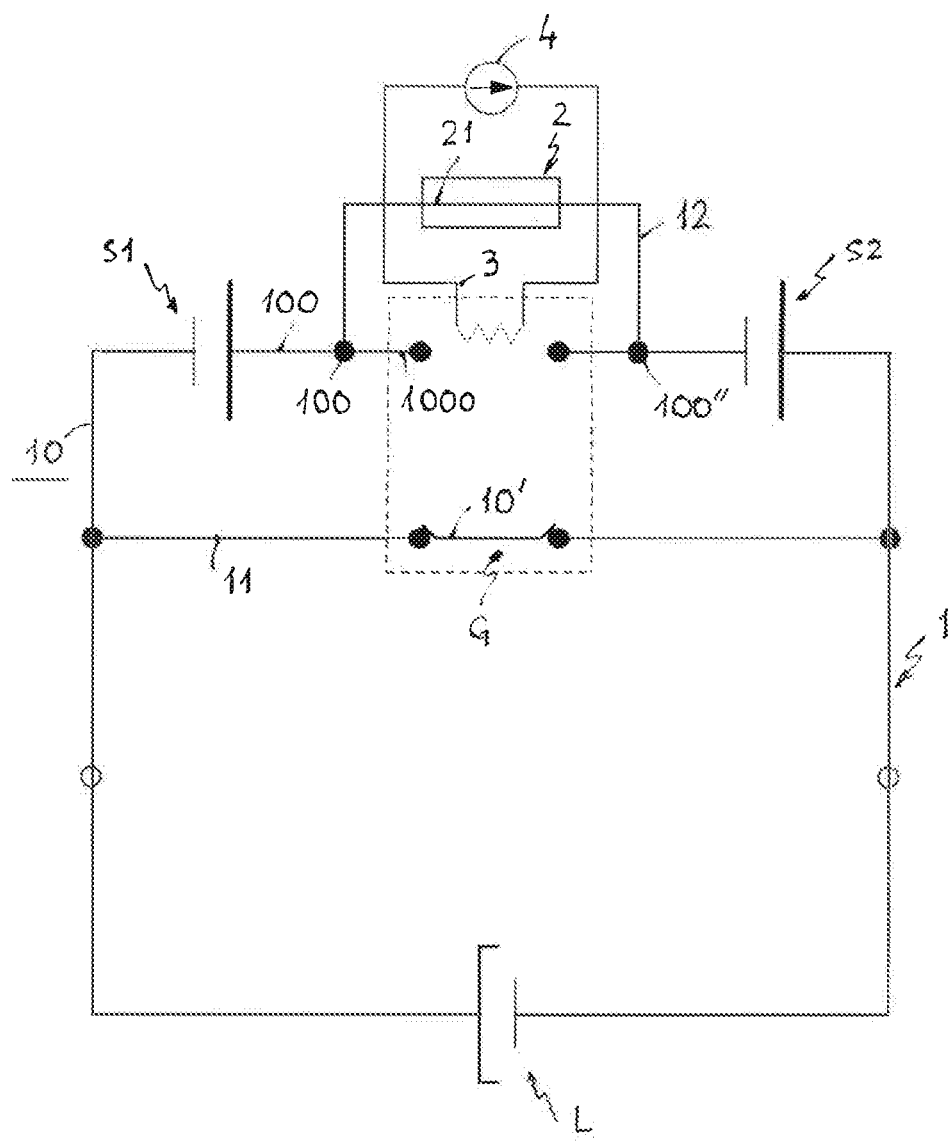
FIG. 3 is a switch according to FIG. 1, presented in a moment of time when upon interruption of the main circuit another electric circuit through a supplemental conductor and a fuse is established.

As shown in FIGS. 1-3, in the intermediate area 1000 between said connecting points 100' and 100", said main conductor 10 is furnished with a movable section 10', which may be capable of, under pre-determined conditions, movement from the main conductor 10 and irreversibly moved into the gap G in said supplemental electric conductor 11, which becomes electrically conductive, while simultaneously the main electric conductor 10 upon moving said section 10' therefrom becomes electrically open. Said movable section 10' and the area of the supplemental conductor 11 adjacent to the gap G may be designed in a myriad ways and the specific design of said movable section 10' is not restricted.

In some embodiments, as shown in the Figures, said section 10' of the main conductor 10 is movable into the gap G in the supplemental conductor 12 by a pyro-switch 3 activated by means of a sensor 4. In some embodiments sensor 4 may be an accelerometer or similar device suitable for detecting acceleration/deceleration. As shown in FIG. 1, during regular operation of the electric circuit 1 said load L is via the main electric conductor 10 integrated into the electric circuit, which is energized by two electricity sources S1, S2. In some embodiments, resistance of the fuse 2 is essentially higher than the resistance of conductors 10 or 11, and in such operational mode there may be no, or at least practically, no current through the branch 12.

In some embodiments, as shown in FIG. 2, interruption of the circuit 1 may occur due to emergency reasons. For example, if circuit 1 is installed inside an electric vehicle, a crash of said electrical vehicle or the like may result in certain pre-determined conditions being fulfilled, causing the sensor 4 to activate said pyro-switch 3, which leads to removal of the section 10' from the main conductor 10 and displacement of said section 10' into a gap G in the supplemental conductor 11. As a consequence and as shown in FIG. 3, on the one hand the main conductor 10 becomes interrupted in its intermediate area 1000 between both electricity sources S1, S2, and on the other hand the load L becomes integrated into a short-circuit established through the supplemental conductor 11, the gap G in which is bridged by said section 10' of the main conductor 10 and is therefore electrically conductive. In some embodiments the current may still flow only through the branch 12, which on the one hand allows discharging of the load L and also potentially other loads and electricity sources which might somehow be connected with it.

Figure 4:
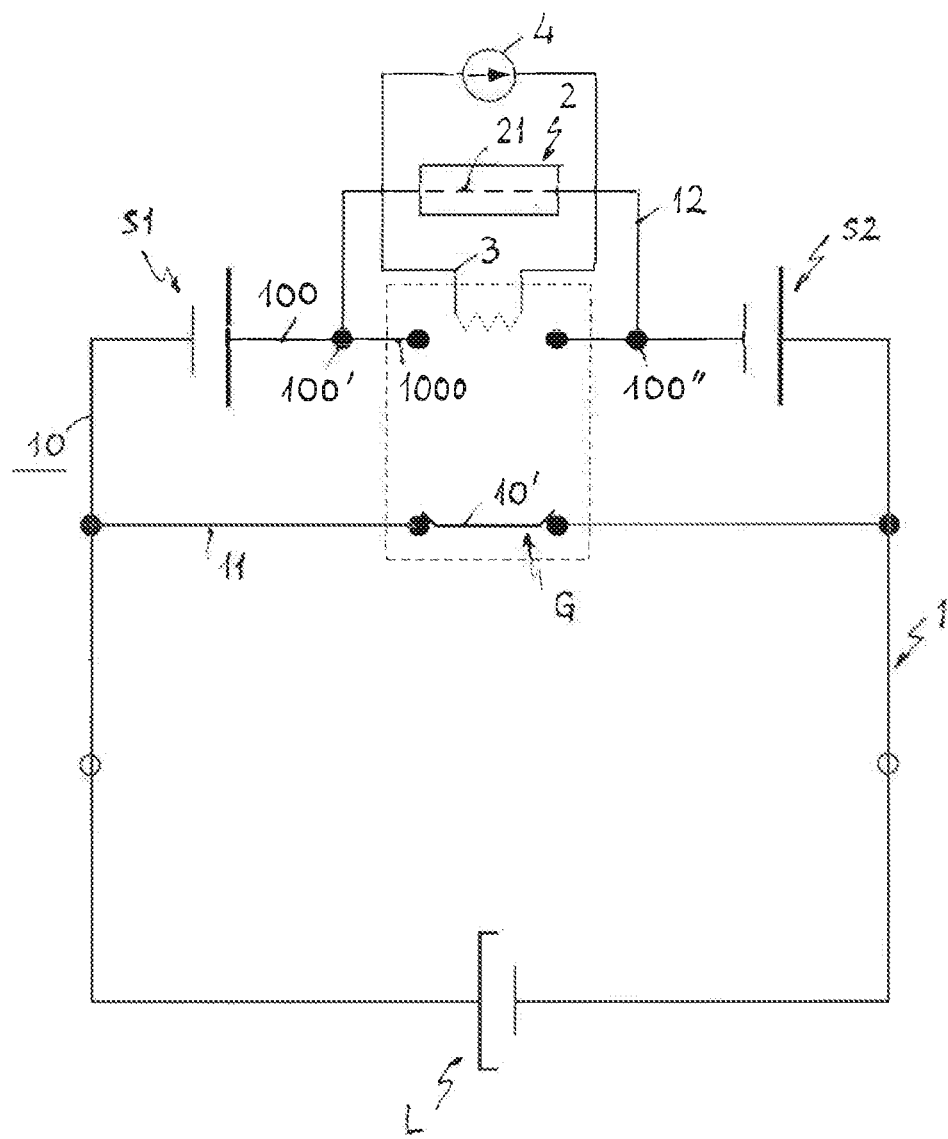
FIG. 4 is a switch according to FIG. 1 in another state, in which upon interruption of the main circuit and establishing of another circuit through a supplemental conductor and a fuse, a melting member of said fuse becomes interrupted.

In other embodiments as shown in FIG. 4, heating and melting of the melting member 21 in the fuse 2, upon which also the branch 12 is interrupted and becomes electrically open. Upon that circumstance, the electrically discharged load L is via the supplemental conductor 11 integrated into its own electric circuit, actually a short-circuit, while the electricity sources S1, S2 via the supplemental conductor 11 remain integrated in a separate circuit, which is however in the intermediate area between the sources S1, S2, physically interrupted and electrically open. Those skilled in the art will understand that, based upon the current and voltage used in electric circuit 1, the length of the section 10' and distance between section 10' when in contact with main conductor 10 versus when moved into contact with supplemental conductor 11 should be sufficient to prevent generation of electric arc upon removal of said section 10' from the main conductor 10 to prevent a short circuit.

While the present disclosure contains many specific implementation details, these should not be construed as limitations on the scope of any disclosure or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described herein as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings or including in the description herein may be listed in a particular order, this should not be understood as requiring that such operations be performed in the particular order shown or in sequential order, or that all operations be required to be performed, to achieve desirable results. In certain circumstances, multitasking and parallel processes may be advantageous.

Although illustrative embodiments have been shown and described, a wide range of modification, change, and substitution is contemplated in the foregoing disclosure and in some instances, some features of the embodiments may be employed without a corresponding use of other features. One of ordinary skill in the art would recognize many variations, alternatives, and modifications. Thus, the scope of any disclosure should be limited only by the following claims, and it is appropriate that the claims be construed broadly and in a manner consistent with the exemplary embodiments disclosed herein.

What is claimed is:

1. A switch for interruption of a direct current circuit comprising:
   two direct current electric voltage sources integrated within said circuit which are connected in series with each other and via a main electric conductor electrically connected with at least one electric load;
   wherein said main electric conductor has a connection between the two electric voltage sources and the at least one electric load connected by a supplemental electric conductor;
   the supplemental electric conductor being electrically connected in parallel to said two electric voltage sources and also with said load;
   wherein prior to activation of the switch or during regular operation of said direct current circuit, the supplemental electric conductor is interrupted by a gap;
   wherein the main conductor further comprises an electrically conductive branch with an integrated electric fuse comprising:
     a melting member which is connected in parallel to said main conductor at two connecting points in an area between both the two electric voltage sources; and
     an accelerometer configured to detect at least one of a predetermined acceleration or a predetermined deceleration, wherein the accelerometer is connected in parallel to the melting member;
   wherein said main conductor further comprises a movable section located at an intermediate area between said two connecting points;
   wherein, in response to the accelerometer detecting the at least one of the predetermined acceleration or the predetermined deceleration:
     the melting member is capable of melting upon which the electrically conductive branch becomes electrically open; and
     the movable section is capable of disconnecting from the main conductor and irreversibly moving into an alternate position into the gap in said supplemental electric conductor which therefore becomes electrically conductive, whereby, upon the moveable section moving into the alternate position, the main electric conductor becomes electrically open.

2. The switch according to claim 1 further comprising:
   a pyro-switch capable of moving the movable section.

\* \* \* \* \*